Patented June 3, 1947

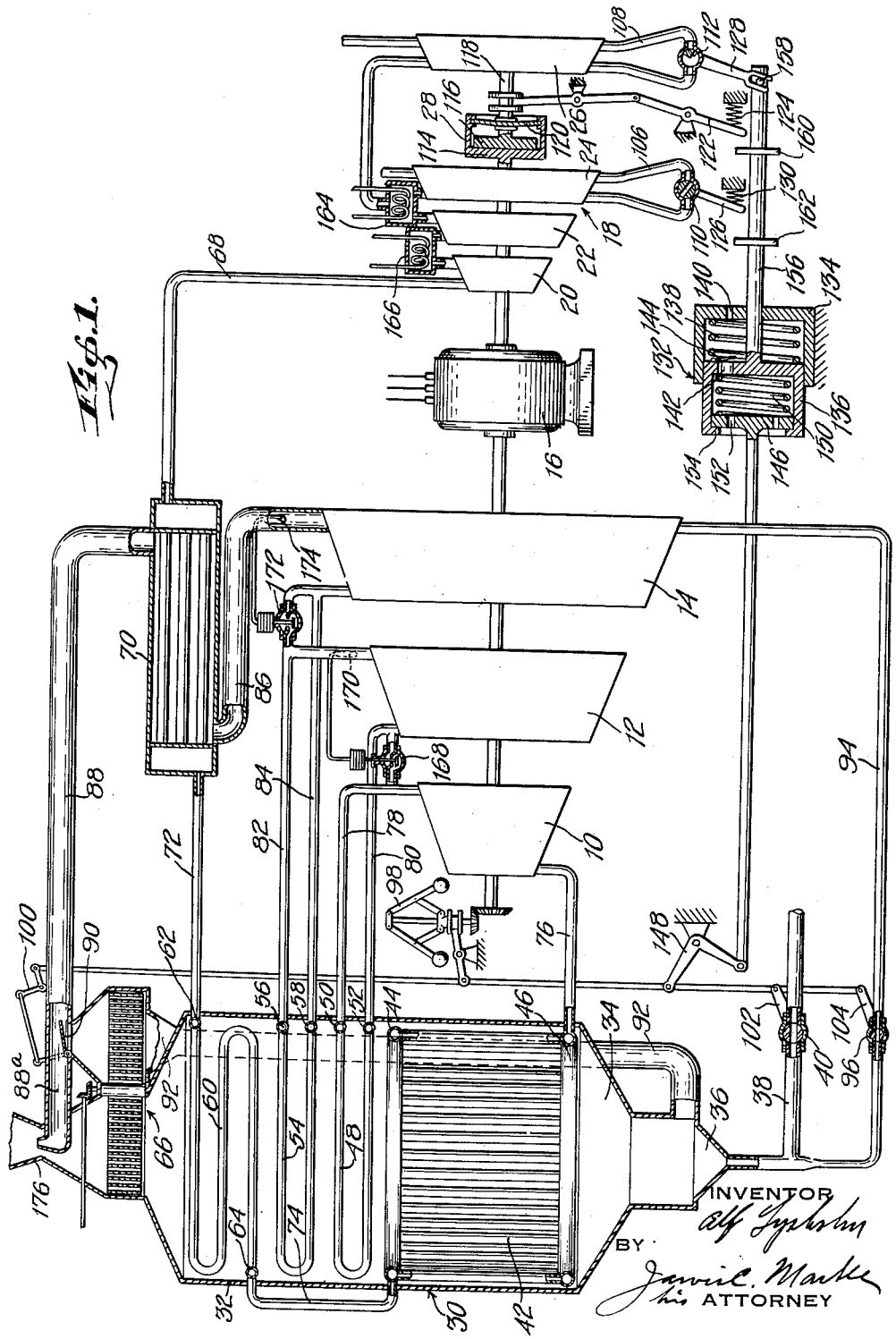

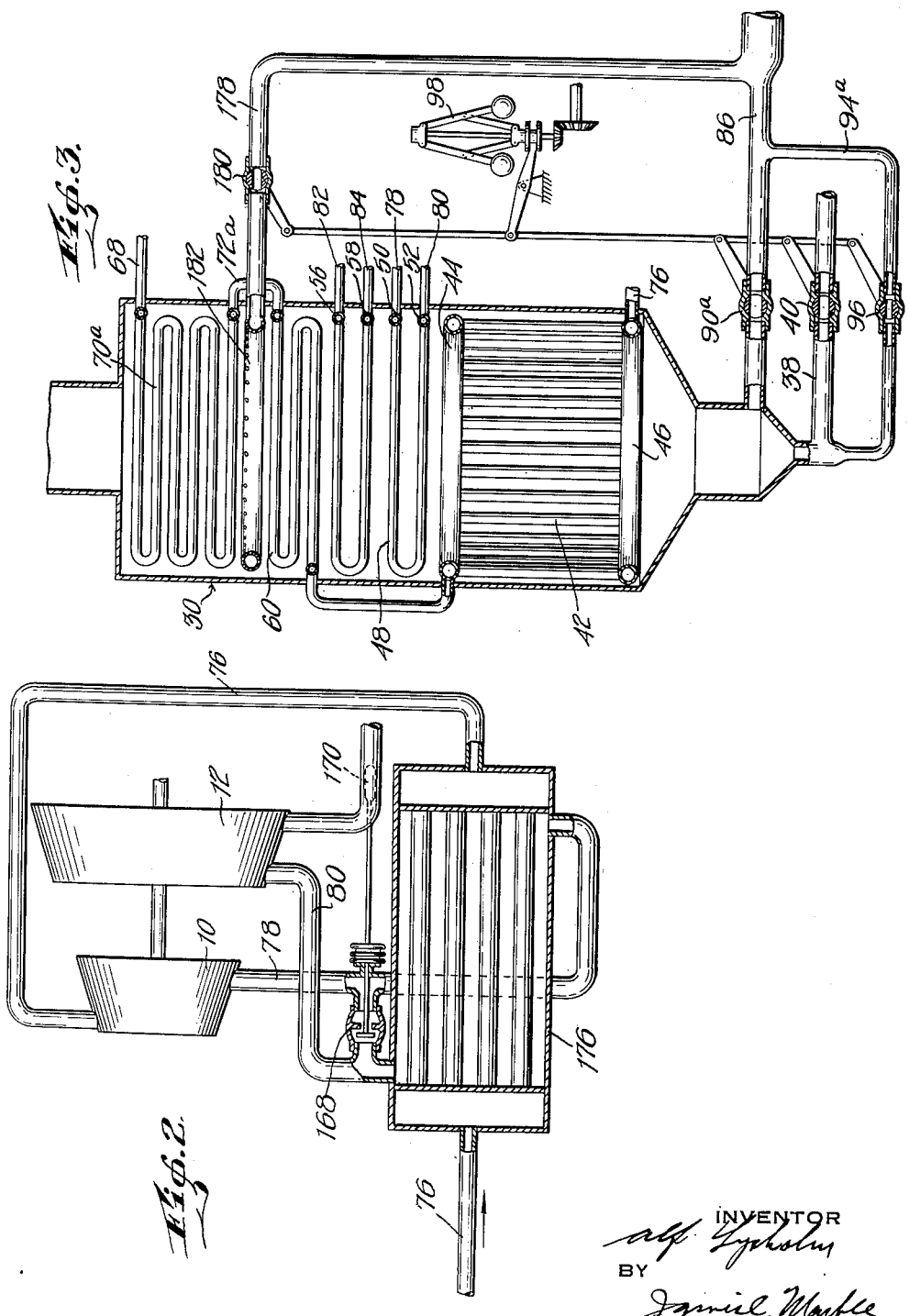

2,421,387

UNITED STATES PATENT OFFICE 2,421,387

HOT AIR TURBINE POWER PLANT WITH AUTOMATIC AIR SUPPLY CONTROL

Alf Lysholm, Stockholm, Sweden, assignor to Aktiebolaget Ljungstroms Angturbin, Stockholm, Sweden, a corporation of Sweden Application April 2, 1943, Serial No. 481,581

16 Claims. (Cl. 60—59)

The present invention relates to power plants and has particular reference to turbine plants.

The great majority of turbine plants now employed are steam power plants in which the heat of the combustion gases generated by burning fuel is converted to steam for expansion in the turbines. The steam power plant inherently involves two main losses, the first being the loss in converting the heat of the fuel into heat in the motive fluid since 100% boiler efficiency is not obtainable, and the second is the loss involved in converting the energy of the motive fluid into mechanical energy. Of this latter loss a large percentage is represented by the latent heat of vaporization of water which cannot be usefully recovered. To overcome these deficiences gas turbine systems have been proposed in which the heat of the fuel is converted directly into a gaseous motive fluid, suitable for expansion in a turbine and comprising the gases of combustion produced by burning the fuel in air compressed by a compressor driven by a turbine utilizing the gaseous motive fluid. The gas turbine system is capable of operating at higher overall thermal efficiency than a steam turbine plant because, among other things, of eliminating the boiler losses inherent in a steam plant and by eliminating the losses incident to the unrecoverable latent heat of vaporization inherent in a steam plant.

While gas turbine systems utilizing combustion gases for expansion in turbines possess many advantages over steam plants, such systems are subject to certain limitations which make them undesirable or even impractical for use under certain conditions. Since the combustion gases must be expanded in turbines, one of the requisites of a practical system is that the gases be relatively clean and free from constituents which would corrode, erode or otherwise adversely affect the turbine blading, which in the high temperature ranges required for gas turbines is always subject to severe mechanical and temperature stresses. The production of suitably clean gas for a gas turbine system may be accomplished when liquid hydrocarbon fuels of suitable composition are available. On the other hand, however, the production of suitable gas for use in such systems is exceedingly difficult when the only fuel available is solid fuel such as coal, on account of ash and other impurities which are exceedingly difficult to completely remove from the combustion gases. Likewise, where the available fuel is natural or other gas, the gas turbine system is not desirable because of the necessity for providing compressors for the gas as well as for the combustion air in order to provide the desired motive fluid under pressure. Also where fuels such as black liquor from sulphite mills or other refuse is available, suitable gases for expansion in turbines are either exceedingly difficult or impossible to produce. Consequently, due to these limitations, the field of the usefulness for the gas turbine system is not universal in spite of its ability to provide higher thermal efficiency than a steam plant.

It is accordingly the general object of the present invention to provide novel method and means for producing power in a turbine plant utilizing air as the motive fluid, the air being compressed by turbine driven compressor means and heated by combustion gases out of contact with the air, whereby to enable substantially any fuel available to be employed, while at the same time providing a thermal cycle capable of producing materially higher thermal efficiency than that obtainable in a steam plant.

The manner in which the above general object of the invention and further and more detailed objects which will hereinafter appear are attained, together with the advantages to be derived from the use of the invention, may best be understood from a consideration of the ensuing portion of this specification taken in conjunction with the accompanying drawings which describe and illustrate by way of example but without limitation suitable methods and means for carrying the invention into effect. In the accompanying drawings forming a part hereof, Fig. 1 is a diagrammatic view illustrative of a power plant embodying the principles of the invention;

Fig. 2 is a diagrammatic view showing a different method of effecting reheating between turbine stages applicable to a plant of the general character illustrated in Fig. 1;

Fig. 3 is a diagrammatic view of a different form of heater arrangement for producing and reheating the motive fluid applicable to a plant of the general character shown in Fig. 1.

Referring now more particularly to Fig. 1 the plant is shown as comprising multiple stage turbine means consisting in the example shown of three turbine sections 10, 12 and 14. Insofar as the invention is concerned, the specific nature of the turbine means may be widely varied and the several turbine sections may operate in a common or separate casing on a common shaft or as units independent of each other as to speed of operation. In the example illustrated, the turbines are shown as driving an electric generator 16 which delivers the useful power from the plant and are further shown as driving the compressor means indicated generally at 18 which in this instance comprises a three-stage compressor system consisting of a high pressure compressor 20, an intermediate pressure compressor 22, and a low pressure compressor section having two compressors 24 and 26 connected in parallel, with the latter compressor being disconnectable by the coupling 28. The air constituting the motive fluid for the turbines is heated in a fuel burning heater indicated generally at 30. Heater 30 comprises a casing 32 providing in the lower portion thereof a furnace or combustion chamber 34 which in the present instance is illustrated as being fired with solid fuel, such as pulverized coal admitted through the burner 36, to which the fuel is supplied through conduit 38 under the control of a valve 40.

Above the furnace 34 there is located a radiant heat section comprising a series of wall tubes 42 connected into top and bottom ring headers 44 and 46. Above this radiant heat section there is located a reheater 48 which in the example illustrated, comprises a series of U-tubes extending transversely of the casing 32 above the radiant heat section and connected into headers 50 and 52. Above this reheater there is located a second reheater 54 comprising similar transversely disposed U-tubes connected into headers 56 and 58. Above this last reheater there is located still another heating section 60 comprising transversely disposed S-tubes connected into headers 62 and 64. On the outlet side of the last mentioned heater there is located a heat exchanger 66 which preferably but not necessarily is of the Ljungström regenerative type, the basic principle of which is disclosed in United States Patent No. 1,652,025 and which is commonly known in the trade as the Ljungström air preheater.

Air from the compressor means is delivered through conduit 68 to a regenerator 70 of the surface type in which heat is transferred to the air from air exhausted from the turbine system. From the regenerator the preheated air is delivered through conduit 72 to the header 62 of the heater 60, the header 64 of which is connected by conduit 74 to the header 44 of the radiant heat section of the heater. From header 46 of this section the heated and compressed air is delivered through conduit 76 to the inlet of the turbine section 10. The outlet of this turbine section is connected by conduit 78 to header 50 of the reheater 48 and the outlet header 52 of this reheater is connected by means of conduit 80 with the inlet of the turbine section 12. The exhaust from turbine section 12 is connected by conduit 82 to the header 56 of the reheater 54 and the outlet header 58 of this reheater is connected by conduit 84 to the inlet of the low pressure turbine section 14. The air exhausted from the turbine is delivered by conduit 86 to the regenerator 70 from which the exhaust air is carried by conduit 88. A portion of the air from conduit 88 passes under the control of valve 90 to the heat exchanger 66 and from this heat exchanger this portion of the air is delivered through conduit 92 to the combustion chamber 34 for supporting combustion of the fuel delivered to the burner 36. In cases where both primary and secondary combustion air are desired for the fuel employed, the turbine exhaust may advantageously be connected directly by means of a conduit 94 to the burner 36 for supplying primary air thereto under the control of valve 96.

The plant illustrated, which produces power for driving an electric generator, may be assumed to operate at constant or substantially constant speed and for such type of operation a load control device indicated conventionally at 98 is shown, which device is connected by any suitable form of control connection indicated diagrammatically at 100 with the valve 90. There is also indicated diagrammatically at 102 a control for the fuel supply to the burner 36 and at 104 a control for the primary air supply.

Where, as in the example illustrated, only two low pressure compressors are employed, it will ordinarily be desirable to provide bypasses such as are indicated at 106 and 108 which are controlled respectively by the valves 110 and 112.

The coupling 28 for disconnecting the low pressure compressor 26 may be of any desired form but by way of example, there is illustrated a coupling comprising a driving member 114 adapted to act against a friction plate 116, the latter being connected by shaft 118 to the compressor 26. The friction member 116 is brought into or out of engagement with the driving member 114 by means of a Belleville washer plate 120. The plate 120 is arranged to be actuated by movement of a lever 122 loaded by means of a spring 124 and valves 110 and 112 are arranged to be moved respectively by levers 126 and 128, the lever 126 being loaded by spring 130.

While the controls for the air and fuel valves 40, 90 and 96 are arranged to act substantially concurrently upon change in load on the plant, the bypass valves 110 and 112 and the coupling 28 are advantageously arranged to operate with a certain time lag upon decrease in load on the plant, for reasons hereinafter to be explained. To this end the connection between these latter elements and the control device 98 is provided with a timing device which in the example illustrated is in the nature of a dash pot arrangement. The timing device indicated generally at 132 consists of a fixed cylinder 134 in which there is mounted a cup-shaped piston 136 subject to the action of a spring 138. Cylinder 134 is provided with a small leak port 140. The base of piston 136 is provided with a port 142 of substantial area controlled by a one-way valve 144 permitting air flow past piston 136 into the interior of cylinder 134 but preventing air flow in the reverse direction. In the example illustrated this valve is a simple gravity loaded flap valve. A piston 146 is mounted within the cup-shaped piston 136 and is connected by means of the linkage 148 to the control device 98. Piston 146 is loaded by spring 150 and is provided with a number of ports 152, permitting air to pass freely through the piston. The piston 136 is provided with an inturned flange 154 adapted to be engaged by piston 146 to cause the two pistons to move together in one direction. Piston 136 is connected to an actuating rod 156 connected by means of pin 158 to the lever 128 which controls the bypass valve 112. Rod 156 also is provided with collars 160 and 162 adapted respectively to engage the levers 122 and 126 for shifting the coupling 28 and controlling the bypass valve 110, respectively. Collars 160 and 162 are located so that the former operates to actuate the lever 122 before the latter commences to effect regulation of valve 110 by engaging lever 126.

Advantageously the air between the several compression stages is cooled by means of suitable intercoolers, diagrammatically indicated at 164 and 166.

For reasons hereinafter to be explained, the means for reheating provided between the different turbine stages are advantageously provided with bypasses, the bypassing between the high and intermediate pressure turbines being controlled by the thermostatically actuated valve 168 operating in response to a thermostat 170 located in the exhaust line from the intermediate pressure turbine. Similarly, the bypass between the intermediate and low pressure turbines is controlled by means of a thermostatically actuated valve 172 responsive to a thermostat 174 located in the exhaust line from the low pressure turbine.

The operation of the above described plant is generally as follows, it being assumed that the plant is operating at normal full load. Under such conditions all of the compressors are in operation, the air being inducted and initially compressed in the lower pressure units 24 and 26 operating in parallel and the delivery from these compressors being further compressed by the intermediate pressure compressor 22 and high pressure compressor 20. The high pressure air delivered from the compressors is first passed through the regenerating heat exchanger 70 where it is preheated by motive fluid exhausted from the turbine system. The preheated air then is delivered through the conduit 72 to the first or convection stage 60 of the heater, from which the air passes for heating to final temperature in the radiant heat section 42. From the latter section the air is delivered to the high pressure turbine unit 10 in which it is partially expanded and from which it is exhausted to the reheater, there passing through the tubes 48 which it will be noted, provide for a combination of radiant and convection heating since the lower rows of tubes in this reheater constitute in effect the roof of the furnace chamber which is directly exposed to radiant heat. The reheated air is next further expanded in the intermediate pressure turbine unit 12 and exhausted to the second reheater, the tubes 54 of which are heated substantially by convection heat. After the second reheating the air is finally expanded in the low pressure turbine unit 14 from which it passes to the regenerator 70. After passing through the regenerator the exhaust air passes through the conduit 88 to the control valve 90 where a portion of this air is diverted for passage through the air preheater 66, from which the preheated air is delivered to provide combustion air for the fuel supplied through burner 36. A portion of the air exhausted from the low pressure turbine 14 may advantageously in some instances be tapped as by means of conduit 94 without passing through the regenerator and employed as primary combustion air in case the furnace is fired by means requiring separate primary and secondary combustion air supplies.

In order to more readily understand the thermal functioning of the above described system it will be assumed, but without limitation, that the plant is designed to operate with an initial admission pressure to the turbines of approximately 200 pounds per square inch and with an initial admission temperature of approximately 650° C. It will further be assumed that each of the turbine sections is designed for an expansion ratio of approximately one to two and one-half. Under such conditions and with the plant operating at normal full load, the air exhausted from the high pressure unit will be at approximately 450° C. and this air will advantageously all be passed under full load conditions through the reheater 48 in which the temperature will be raised substantially to initial temperature, that is, approximately 650° C. Based on the assumption of a one to two and one-half expansion ratio in the high pressure unit the air will be admitted to the intermediate pressure unit at around 70 pounds pressure. The air exhausted from the intermediate pressure unit will again under the assumed conditions be exhausted at approximately 450° C. and will be reheated, preferably to substantially initial admission temperature of 650° C. The admission pressure to the low pressure unit will be approximately 20 pounds per square inch under the assumed conditions. Air finally exhausted from the turbine system under the assumed conditions will be at approximately 450° C. and with a residual pressure sufficient to force flow of the air through the additional equipment through which it must pass. The residual pressure required for this purpose will vary considerably with different plants but for purposes of discussion may be assumed to be of the order of 8–10 inches water column. Under the influence of the residual pressure the exhaust air is forced through the regenerator, the area of heat exchange surface of which is advantageously designed to bring the temperature of the air down to the order of 150° C. The portion of the air diverted by the control valve 90 enters the preheater at this temperature and the preheater is advantageously designed to raise the temperature to approximately 400° C., at which temperature the preheated air is delivered to the combustion chamber.

The heating surface of the heater is proportioned so that after passing the radiant heat section the temperature of the gases is further reduced by convection heat transfer to a temperature of the order of 500° C. on leaving the last heating surface before entering the air preheater. With a Ljungström type regenerative preheater, the combustion gases entering the heater at this temperature can preheat the combustion air from approximately 150° to approximately 400° by being cooled from a 500° inlet temperature to approximately a 250° final exhaust temperature.

The quantity of air required for operation of the turbine system is very considerably greater than that required for the combustion of the amount of fuel required to operate the system and for purposes of discussion it may be assumed that under normal full load operating conditions about 30% of the exhaust air will be diverted for combustion air in the heater. The portion diverted will vary considerably depending upon the percentage of excess combustion air allowed for in the combustion system of the heater.

The residual pressure in the portion of the exhaust air which is not diverted for combustion purposes may also advantageously be employed to assist in creating the required draft through the furnace. This energy may be utilized in different specific ways but advantageously from the standpoint of simplicity and low cost of installation, the undiverted exhaust air discharged through conduit 88a is delivered to the nozzle of an exhaust gas ejector 176 where the pressure energy is converted to velocity energy for producing a draft inducing vacuum.

The air finally exhausted from the system represents a thermal loss but it is to be noted that the exhaust temperature of this air is relatively very low and in comparing this system with a steam plant, it is further to be noted that in the present instance no loss is incurred on account of unrecoverable latent heat of vaporization.

A definite and substantial gain is made by the utilization of the portion of the exhaust air which is preheated and used for combustion air. This gain is effected because of the residual exhaust pressure which is readily obtainable, since the turbine design can be made such that the exhaust pressure from the turbines will be of any desired value. With the exhaust air under suitable pressure, it is possible to eliminate all forced or induced draft fans for maintaining the desired draft through the heater and also for overcoming the resistance to flow of the exhaust air through the regenerator and of both the air and gases through the preheater. In comparable boiler and turbine installations for steam plants in which the combustion air is ordinarily preheated, large and expensive fans which consume appreciable amounts of power are required in order to effect the necessary flow of combustion gases and preheated combustion air. Since by utilizing the combustion air preheater the combustion gases can be reduced to a final temperature of the order of 250°, it will be evident that the thermal loss of the available heat due to exhaust gas loss will be very slight. In the example given, it is assumed that the exhaust air discharged from the regenerator is at approximately 150° C., and it is evident that the loss in the heater is only a matter of approximately 100° C. which constitutes the difference between the temperature of the exhaust air admitted to the preheater for combustion purposes and its exit temperature from the heater in the form of combustion gases.

The general arrangement of the heating surface of the heater is particularly advantageous for variable load plants, from the standpoint of maintaining as high as possible the operating efficiency at partial load values.

It will be noted that the primary heating surface consists of an initial convection portion from which the partially heated air is delivered to and finally heated in a radiant heat section. This arrangement will operate to provide inherently a more or less stable delivery temperature upon decrease of load for the reason that a characteristic of a convection heater is to produce a drop in temperature of the heated fluid with decrease in load. On the other hand, fluid heated in a radiant heater tends to be heated to a higher temperature upon decrease in load and with the arrangement shown, these two opposite characteristics tend to neutralize each other to produce a relatively constant final air temperature. Obviously, other control means such as bypasses and the like, may be employed if more closely regulated admission temperature to the high pressure turbine is desired.

The reheater for reheating between the high pressure and intermediate pressure turbine sections is also, as previously noted, heated by a combination of radiant and convection heat tending to give a flat temperature characteristic as the load drops.

When the load on the plant decreases this results in a tendency for the exhaust gas temperature to rise, particularly in the case of the low pressure turbine unit which exhausts to constant or substantially constant back pressure. In order to prevent a rise in exhaust temperature to a value which would endanger the blading of the exhaust stages of the turbine, which might occur particularly at low loads, the bypass controls for the reheaters are provided, these controls operating on rise of exhaust temperature to open the bypasses so as to lower admission temperatures to compensate for the rise in exhaust temperature which would occur if constant admission temperature were maintained. The rising exhaust temperature effect with decrease of load is most pronounced in the low pressure turbine and in this connection it is to be noted that the convection location of the reheater for the low pressure turbine in the embodiment illustrated is advantageous since such a reheater has a falling temperature characteristic with decrease in load and will tend, even without the bypass control, to produce a lowered admission temperature to the low pressure turbine at part load. Thus, this type of reheater works cumulatively with the bypass control to attain the desired result.

The rising exhaust temperature effect will also be felt with decrease in load in the intermediate pressure turbine but not to such pronounced degree as in the low pressure turbine. For this reason the reheater for this turbine may be of the combined radiant convection type having a relatively flat temperature characteristic with variation in load since it is only at the lower loads that it will likely be necessary to reduce the admission temperature to the intermediate pressure turbine and this can readily be accomplished by means of the bypass control.

The tendency for exhaust temperature rise to occur with decrease in load is relatively slight in the high pressure turbine and for this turbine the bypass control will ordinarily not be required, although if desired it may be employed as a safety measure for extremely low loads or idling.

In some instances a plant may be subject to very sudden decrease in load of substantial magnitude and in order to avoid possible overheating or burning of the tube structure in the heater, a control is advantageously employed which will operate to reduce the combustion rate on a sudden drop of load more rapidly than the rate of air circulation through the heater is decreased, or in other words, a control is provided which will result in delay action of reduction of air circulation on sudden decrease in load. To this end the main control device 98, which has been shown schematically as a flyball governor but which, it will be understood, will in the case of a constant speed plant of the kind under discussion be some form of known return motion load control device, is indicated as being directly connected with the fuel valve 40 and the air control valves 90 and 96 so that upon change of load the control of fuel and combustion air to the heater will act immediately.

As previously noted, it is desirable upon decrease in load, particularly sudden decrease of substantial value, to delay reducing the air supplied to the heater until after the combustion rate has been reduced. To this end a timing device, such as that diagrammatically illustrated at 132, is employed. The action of this device is as follows:

On decrease in load the piston 146 will be moved to the right against spring 150, the latter tending to move the cupped piston 136 and the actuating rod 156 to the right. Movement of this latter piston will, however, be delayed by air trapped in the fixed cylinder 134, valve 144 closing and the only egress of air from cylinder 134 being through the small leak port 140 which may if desired be made with an adjustable or regulable aperture. As the air leaks from cylinder 134, spring 150 will act to move the regulating rod 156 and begin opening the bypass valve 112 so as to reduce the quantity of air being supplied by the compressor means.

Movement of rod 156 to a position corresponding to a predetermined decrease in load can be made before the collar 160 actuates lever 122 to throw out the coupling 28. When the load drops below this predetermined value, the coupling 28 may be disconnected to throw the low pressure compressor 26 out of action to further reduce the quantity of air compressed. Still further movement upon further decrease in load may then actuate valve 110 to bypass a part of the air being compressed by the remaining low pressure compressor 24. In each case, upon decrease in load from a previously stabilized position, there will be delay action due to the cushion or dashpot of air in cylinder 134 which can escape therefrom only through the leak orifice.

Upon increase in load it is desirable to increase the supply of compressed air simultaneously with the increase of the rate of combustion of fuel in the heater and it will be observed that the timing device 132 effects this action since there is no delay involved between the movement of piston 146 and rod 156 when the piston moves to the left on increase in load from a stabilized position. This is because of the fact that in any stabilized position piston 146 bears against the flange 154 of piston 136, providing direct mechanical connection with the rod 156. Movement of piston 136 to the left on increase in load is permitted without appreciable resistance since the flap valve 144 will open to permit free flow of air into cylinder 134 to prevent the creation of a partial vacuum therein. On movement in response to increase in load the bypass valve 110 is closed and coupling 28 reengaged at appropriate times by the action of the springs 130 and 124, respectively, the last action to occur being the closing of the bypass valve 112 as the load approaches full load value.

It will, of course, be appreciated that any one of numerous known forms of mechanical, electrical or hydraulic time delay devices may be employed for securing the delayed regulation of the air supply furnished by the compressor means.

While for numerous reasons it is ordinarily highly advantageous to consolidate all of the heating and reheating surface necessary for preparing the motive fluid for admission to the turbines in a heater or heaters in which the heat is imparted to the air directly by the combustion gases, there may be instances where limitations imposed upon plant layout would require conduits too long to be desirable or practical in order to return the air for reheating from the turbine sections to the heater. In such instances a more desirable practical arrangement may be to impart a higher initial temperature to the air in the heater than is desired for admission to the high pressure turbine section and to utilize a portion of this heat in a reheater in the form of a surface type heat exchanger. Such an arrangement is illustrated in Fig. 2 in which the conduit 76 is shown as passing the air through a reheater 176 before delivering it to the high pressure turbine section. The reheater in this instance is shown as effecting a reheating between high pressure and intermediate pressure turbine sections. Where a plurality of reheatings is required the high temperature air leaving the heater can be arranged to flow serially through different reheaters for the different stages, the limiting factor in such case being the total temperature of the air leaving the heater required to effect the desired total temperature rise in the series of reheaters while leaving a residual temperature in the motive fluid suitable for admission to the turbine. The value of the maximum temperature to which the air can be heated will in most instances be limited by the character of the material used for the heating tubes.

In some instances it may be desirable or convenient to incorporate all of the heat exchange structures in a single unit and in Fig. 3 an arrangement is shown wherein the regenerator is located in the heater. Referring to this figure, in which parts corresponding to parts shown in Fig. 1 are correspondingly numbered, the radiant heat section and the interstage reheaters are the same as illustrated in Fig. 1. In the present instance, however, the conduit 68 delivers to a reheater 70a in the form of a series of tubes located at the outlet end of the gas passage in the heater, the regenerator 70a delivering through the conduit 72a to the heating section 60 from which the air is delivered to the radiant heat section 42.

The air required for primary and secondary combustion is brought directly from the turbine exhaust through conduit 86 and branch conduit 94a, fuel being supplied through conduit 38 and control being effected by valves 90a, 40 and 96, the control arrangement being essentially the same as that previously described in connection with Fig. 1.

In the present instance, the exhaust air not required for combustion purposes is admitted to the combustion gas passage of the heater through a conduit 178 controlled by valve 180, this air conveniently being mixed with the combustion gases by being delivered through a perforated header 182 located in the path of combustion gas flow between the heating tubes 60 and the regenerator 70a.

As will be apparent from the drawing, the formation and utilization of the combustion gases is the same as previously described in connection with Fig. 1 until after the gases have passed over the heating section 60. Thereafter the combustion gases are mixed with the exhaust air from the turbines and thereafter the regeneration is effected by means of the regenerator 70a.

The function of the control valve 180 is merely to control the resistance of flow of the air to the distributing header 182 so as to create sufficient back pressure to enable the exhaust air used for combustion to be forced into the heater with sufficient pressure to overcome the resistance to flow of combustion gases through the heater. Since both combustion air and the air delivered to header 182 can readily be delivered to the heater at positive pressure, it will be evident that the necessary draft through the entire heater can be maintained without the necessity for employing either forced or induced draft fans.

While in the foregoing there has been described by way of illustration one specific type of power plant, it will be evident that the broad principles of the invention as hereinafter defined in the appended claims, are applicable to a wide variety of specific power plant designs of both the constant and variable speed type in which many different numbers, combinations and arrangements of turbines and compressors may be employed, operating at the same speed or as different units independent of each other in respect to speed of operation. In other respects as well the present invention permits of the utilization of typical gas turbine apparatus of known type and while the invention is not limited to such apparatus, the employment of full admission reaction turbine units of the general form of construction disclosed in my prior Patent No. 2,080,425 and displacement type of rotary compressors of the kind disclosed in my prior Patent No. 2,243,874 are considered to be preferable, as is also the Ljungström regenerative type of air preheater.

From the foregoing it will be apparent to those skilled in the art that the invention is susceptible of being carried into effect with many different specific forms and arrangements of apparatus and the invention is accordingly to be considered as embracing all methods and forms of apparatus embraced within the scope of the appended claims.

What is claimed is:

1. The method of generating power by the aid of turbine means, compressor means and a fuel burning surface type heater which includes compressing air in said compressor means, heating the compressed air in said heater with high temperature combustion gases out of contact with the air, expanding the heated and compressed air in said turbine means to generate externally useful power and to drive said compressor means, utilizing a first portion of the air exhausted from said turbine means for burning fuel supplied to said heating means to produce said combustion gases and utilizing a second portion of the air exhausted from said turbine means to create a draft for said heater.

2. The method of generating power by the aid of turbine means, compressor means and a fuel burning surface type heater which includes compressing air in said compressor means, heating the compressed air in said heater with high temperature combustion gases out of contact with the air, expanding the heated and compressed air in said turbine means to generate externally useful power and to drive said compressor means, passing a first portion of the exhaust air from said turbine means in heat exchange relation out of contact with combustion gases leaving said heater, utilizing air of said first portion of the exhaust air for combustion of fuel to produce said combustion gases and utilizing a second portion of the exhaust air from said turbine means to create a draft for said heater.

3. The method of generating power by the aid of turbine means, compressor means and fuel burning air heating means which includes the steps of compressing air in said compressor means, heating the compressed air in said heater by high temperature combustion gases out of contact with the air, expanding the heated and compressed air in said turbine means to generate externally useful power and for driving said compressor means, passing the exhaust air from said turbine means in heat exchange relation out of contact with air supplied by said compressor means, thereafter passing a portion only of said exhaust air in heat exchange relation out of contact with combustion gases exhausted from said heating means and utilizing air of said portion of said exhaust air for combustion of fuel to produce said combustion gases.

4. The method of generating power by the aid of turbine means having a plurality of expansion stages, compressor means and fuel burning air heating means which includes the steps of compressing air in said compressor means, heating the compressed air in said heater by means of high temperature combustion gases out of contact with the air, partially expanding the heated and compressed air in one or more stages of said turbine means, reheating at least a portion of the partially expanded air in said heating means out of contact with the combustion gases, further expanding the reheated air in one or more additional stages of said turbine means, utilizing the power generated by said turbine means to produce externally useful power and for driving said compressor means, passing exhaust air from said turbine means in heat exchange relation out of contact with air supplied from said compressor means, subsequently passing a portion of said exhaust air in heat exchange relation out of contact with combustion gases exhausted from said heating means and utilizing air of said portion of said exhaust air for combustion of fuel to produce said combustion gases.

5. The method of generating power by the aid of turbine means, compressor means and fuel burning air heating means which includes the steps of compressing air in said compressor means, heating the compressed air substantially by radiant heat from high temperature combustion gases generated by said heating means, partially expanding the heated and compressed air in one or more stages of said turbine means, reheating the partially expanded air substantially by convection from said combustion gases, further expanding the reheated air in one or more additional stages of said turbine means, utilizing the power generated by said turbine means to produce externally useful power and for driving said compressor means, passing the exhaust air from said turbine means in heat exchange relation out of contact with air supplied from said compressor means, subsequently passing a portion of said exhaust air in heat exchange relation out of contact with combustion gases exhausted from said heating means, and thereafter utilizing air of said portion of said exhaust air for combustion of fuel to prdouce said combustion gases.

6. In the operation of a power plant of the kind in which air heated by combustion gases is expanded in a turbine to produce power, that improvement which consists in passing air exhausted from the turbine in heat exchange relation out of contact with air to be heated by said gases, reheating a portion of the cooled exhaust air by combustion gases previously utilized to heat air and utilizing the reheated exhaust air for combustion with fuel to produce said combustion gases.

7. The method of generating power by the aid of turbine means, compressor means and a fuel burning surface type heater which includes the steps of compressing air in said compressor means, heating the compressed air by high temperature combustion gases out of contact therewith produced in said heater, expanding the heated and compressed air in said turbine means to produce externally useful power and for driving said compressor means, mixing at least a portion of the air exhausted from said turbine means with combustion gases produced and previously cooled in said heater and preheating the compressed air delivered by said compressor means with the gaseous mixture thus produced prior to the aforesaid step of heating by combustion gases in said heating means.

8. The method of generating power by the aid of turbine means, compressor means and a fuel burning surface type heater which includes the steps of compressing air in said compressor means, heating the compressed air by high temperature combustion gases out of contact therewith produced in said heater, expanding the heated and compressed air in said turbine means to produce externally useful power and for driving said compressor means, utilizing a first portion of the air exhausted from said turbine means for burning fuel to produce said combustion gases and mixing a second portion of the air exhausted from said turbine means with combustion gases produced and previously cooled in said heater to preheat the compressed air delivered by said compressor means with the gaseous mixture thus produced prior to the aforesaid step of heating by combustion gases in said heating means.

9. The method of operating a power plant comprising turbine means, compressor means and a fuel burning surface type heater, which includes compressing air in said compressor means, heating the compressed air by combustion gases out of contact therewith produced in said heater, expanding the heated and compressed air in said turbine means to generate power, utilizing a portion of said power for driving said compressor means, utilizing at least a portion of the air exhausted from said turbine means in the operation of said heater and regulating the operation of said plant in response to reductions in load on said turbine means by reducing the fuel and air supplies to said heater substantially concurrently with the reduction in load and thereafter reducing the quantity of air supplied by said compressor means to a value commensurate with the reduced load.

10. The method of operating a power plant comprising turbine means, compressor means and a fuel burning surface type heater, which includes compressing air in said compressor means, heating the compressed air by combustion gases out of contact therewith produced in said heater, expanding the heated and compressed air in said turbine means to generate power, utilizing a portion of said power for driving said compressor means, utilizing at least a portion of the air exhausted from said turbine means in the operation of said heater, and regulating the operation of said plant in response to increases in load by increasing the fuel and air supplies to said heater and the quantity of air supplied by said compressor means substantially concurrently with the increase in load of the plant.

11. The method of operating a power plant comprising turbine means, compressor means including at least two separate compressors and a fuel burning surface type heater having a furnace, which includes compressing air in said compressor means, heating the compressed air in said heater with combustion gases out of contact therewith, expanding the heated and compressed air in said turbine means to generate power, utilizing a portion of said power to drive said compressor means, utilizing at least a portion of the air exhausted from said turbine means in the operation of said heater and regulating the operation of said plant in response to decreases in load by reducing the fuel and air supplies to said furnace substantially concurrently with reductions in load, thereafter reducing the quantity of air supplied by said compressor means by bypassing a portion of the compressed air until a predetermined value of part-load operation is reached and thereafter rendering inoperative at least one of said compressors when the value of said part-load falls below said predetermined value.

12. A power plant including turbine means, compressor means driven by said turbine means, a fuel burning surface type air heater, means for delivering compressed air from said compressor means to said heater, means for delivering heated and compressed air from said heater to said turbine means for expansion therein, means for delivering exhaust air from said turbine means to said heater for combustion with fuel for operating the heater, and governing means responsive to variations in external load on the plant for varying the quantity of compressed air delivered by said compressor means and the quantity of exhaust air delivered to said heater.

13. A plant as set forth in claim 12 in which said governing means includes a time delay device operative upon decrease in said external load to decrease the quantity of compressed air delivered to the heater until after the quantity of exhaust air delivered thereto is decreased.

14. A plant as set forth in claim 12 in which said compressor means comprises a plurality of compressor units and a coupling for disconnecting the drive to at least one of said units and in which said governing means is operative to disconnect at least one of said units when the external load on the plant decreases to a predetermined part load value.

15. A plant as set forth in claim 12 in which said governing means includes time delay means for causing the governing means to decrease the quantity of compressed air delivered to the heater only after the lapse of a predetermined time interval following a decrease in the external load on the plant.

16. A plant as set forth in claim 12 in which said governing means includes time delay means for causing the governing means to decrease the quantity of compressed air delivered to the heater only after the lapse of a predetermined time interval following a decrease in the external load on the plant and said time delay means being operative only when said load changes to a decreased value, whereby to cause said governing means to cause the supply of compressed air to be increased substantially concurrently with increase in said load.

ALF LYSHOLM.

REFERENCES CITED

The following references are of record in the file of this patent:

UNITED STATES PATENTS

| Number | Name | Date |
|---|---|---|
| 615,311 | Schmidt | Dec. 6, 1898 |
| 878,953 | Hess | Feb. 11, 1908 |
| 892,818 | de Ferranti | July 7, 1908 |
| 1,164,960 | Ray | Dec. 21, 1915 |
| 1,864,448 | Lorenzen | June 21, 1932 |
| 2,203,731 | Keller | June 11, 1940 |
| 2,394,253 | Nettel et al. | Feb. 5, 1946 |

FOREIGN PATENTS

| Number | Country | Date |
|---|---|---|
| 126,940 | Great Britain | Jan. 6, 1919 |
| 468,287 | Great Britain | July 1, 1937 |
| 498,882 | Great Britain | Jan. 13, 1939 |
| 356,329 | Germany | July 20, 1922 |
| 520,654 | Germany | Mar. 17, 1931 |
| 215,485 | Switzerland | Oct. 1, 1941 |